Patented Apr. 30, 1935

1,999,529

UNITED STATES PATENT OFFICE 1,999,529

METHOD OF MAKING HERMETICALLY SEALED MIRRORS

Rowland D. Smith, Corning, N. Y., assignor to Corning Glass Works, Corning, N. Y., a corporation of New York No Drawing. Application November 14, 1933, Serial No. 698,025

4 Claims. (Cl. 91—68.2)

This invention relates to mirrors, and more particularly to mirrors comprising a thin layer of silver or other highly reflecting metal deposited on glass.

In making such mirrors and particularly those coated with silver, it has been customary to apply a protective coating to the silver layer to prevent tarnishing, peeling, or other deterioration thereof. Such coatings have comprised paints, lacquers and varnishes with or without a sub-layer of copper deposited electrolytically over the silver. As far as I know, all prior coatings or methods of protecting mirrors have been unsatisfactory in that they do not permanently protect the mirror from deterioration, due to atmospheric influences. Paints, lacquers, and even electroplated copper will not permanently adhere to glass, especially under changing temperature and atmospheric conditions.

The primary object of this invention is to hermetically seal metal mirrors on to glass so that they are permanently impervious to atmospheric influences and are capable of withstanding all thermal changes incident to their use.

Another object is to make a mirror, the backing material of which can expand or contract independent of the mirror itself.

The above and other objects may be attained by practicing my invention which embodies among its features the method which comprises depositing a reflecting layer of metal, such as silver, on the glass so as to slightly overlap an encircling border of metal which has previously been fired into the glass, electroplating the exposed surface and coating the electroplated layer with a suitable backing material, such as solder or a ceramic glaze.

Another feature of my invention comprises introducing between the mirror and its backing material a layer of a relatively non-adhesive substance, such as graphite.

Although, if precautions are taken to avoid sudden thermal changes, I may apply my mirror to ordinary high expansion glass, I prefer to use a heat resistant glass such as the glass B₂ of the Sullivan and Taylor Patent No. 1,304,623, in the use of which such precautions are practically unnecessary.

In practicing my invention, I fire into the glass a narrow band, ⅛″ to ¼″ in width, of metal completely encircling and bordering the area which is to be made a mirror. For this purpose I may use any of the so-called metallic lusters, such as silver, platinum, gold, and the like, but I prefer to use silver luster in the form of a paste, hereinafter called silver paste, comprising, as commonly known to the art, a flux such as lead borate, finely powdered metallic silver, or silver compound, and a vehicle such as lavender oil. I have found that such silver paste fluxes more readily into glass if a small amount, say 10%, of lead fluoride is incorporated therewith, and I prefer to use such a mixture. The silver paste mixture is applied to the glass in the desired position with a brush and the glass is then fired to a temperature of about 600° C. for a few minutes, after which the glass is cooled to room temperature, preferably at such a rate as to anneal it.

I then form a mirror of a suitable reflecting metal on the glass within the bordering metal band so that the mirror slightly but not entirely overlaps the border. In forming the mirror, I prefer to deposit silver chemically from solution by means of a reducing agent in accordance with the well known Brashear method of depositing silver mirrors. For purposes requiring a cheaper and less reflective mirror, I may use zinc or aluminum or alloys thereof applied to the glass by spraying the molten metal as in the Schoop process, or by any other suitable means.

After the mirror is formed, I make the exposed metal surface the cathode in a copper plating bath comprising preferably a 10% solution of potassium bitartrate saturated with basic copper carbonate and made slightly alkaline with potassium carbonate, as described in the Journal of the American Optical Society, vol. 25, page 237. A current density of about .01 to .02 ampere is applied for sufficient length of time to secure a thin adherent coating of copper covering the deposited metal mirror and the exposed portion of the metallic band which borders it.

I then coat the plated copper coating with a suitable backing material, such as a low melting metal or metal alloy, for example, solder, or a suitable ceramic glaze. The solder coating is best applied by dipping the article into a bath of molten solder so as to immerse the portion which is covered by the copper plating. In applying the solder coating, I prefer to use a suitable flux, such as rosin, to cause the solder to wet the copper more readily. The ceramic glaze, many formulae for which are available in the literature, should have a fusion point below the softening point of the glass and is applied as a slip and fired on in known manner.

In the mirrors thus formed, the reflecting metallic surface is completely and hermetically covered by the superimposed layers of copper plating and backing material. The overlapping layers of copper and solder or ceramic material are permanently attached to the metallic band which borders the reflecting metallic surface and which in turn is permanently incorporated with the glass surface. It will thus be evident that mirrors made by my process are permanently protected from atmospheric influences.

However, it sometimes happens that the plated copper coating will be somewhat porous and will have one or more minute perforations or pinholes, due to failure of the electrolysis to cover properly. In this case the solder coating tends to penetrate through the pores and alloy with the reflective silver coating, thereby impairing its reflecting efficiency. Furthermore, the difference in expansion coefficient of the glass and the backing material will sometimes cause the mirror to be torn away from the glass with consequent damage to the reflecting surface. I have found that I can overcome these difficulties by placing beneath the copper plating a layer of some material which is electrically conducting, which is not wet by the solder, and which will not resist shearing stress, and hence will prevent penetration of the solder or tearing of the mirror by expansion or contraction of the backing material. Graphite is a good conductor, does not wet with solder nor adhere strongly to the mirror or its backing material, and hence is particularly suitable for this purpose. For best results in applying the graphite layer, I prefer first to copper plate the silver coatings, as above described, in order to gain additional protection for the delicate silver mirror and then to apply the graphite over the copper plating to be followed by a second plated copper coating over the graphite. The form of graphite best suited for my purpose is a very finely comminuted graphite, and I prefer to use the preparation known as "Aquadag" consisting of colloidal graphite suspended in water which I apply by dipping or by spraying. In applying the graphite layer, I do not cover the entire plated coating of copper, but I leave a narrow band around the edge thereof uncovered. In other words, I apply the graphite only to that portion of the copper plating which covers the reflecting mirror. This is done in order that the graphite layer may be completely sealed between the first plated copper coating and the second plated copper coating which covers the graphite and merges with the exposed edge of the first plated copper coating. After the graphite has been applied, I allow it to dry and become set so that it will not wash off in the succeeding operation.

I then plate with copper over the graphite and over the exposed edge of the first plated copper coating by means of the electrolytic bath described above. The second copper plating is then covered with solder or a ceramic glaze in the manner described above.

Mirrors thus made with an enclosed graphite layer can be produced with great uniformity and with no losses due to imperfections or to thermal expansion differences.

What I claim is:

1. The method of hermetically sealing a metal mirror on glass, which includes firing a narrow band of metal luster into the glass, completely bordering the area to be covered by the mirror, depositing a metal mirror within the area and slightly overlapping the fired-in border, electroplating the mirror and the border with copper and coating the copper layer with a backing material.

2. The method of hermetically sealing a metal mirror on glass, which includes firing a narrow band of metal luster into the glass completely bordering the area to be covered by the mirror, depositing a metal mirror within the area, and slightly overlapping the fired-in border, electroplating the mirror and the border with copper, coating the copper above the mirror with finely comminuted graphite, electroplating over the graphite and the border with a second layer of copper and coating the second layer of copper with a backing material.

3. The method of hermetically sealing a silver mirror on glass, which includes firing into the glass a narrow strip of silver paste to form a band of metallic silver completely bordering the area to be covered by the mirror, depositing a silver mirror within the area and slightly overlapping the fired-in border, electroplating the mirror and the border with copper and coating the copper layer with solder.

4. The method of hermetically sealing a silver mirror on glass, which includes firing into the glass a narrow strip of silver paste to form a band of metallic silver completely bordering the area to be covered by the mirror, depositing a silver mirror within the area and slightly overlapping the fired-in border, electroplating the mirror and the border with copper, coating the copper above the mirror with finely comminuted graphite, electroplating over the graphite and the border with a second layer of copper, applying a solder flux to the second layer of copper and coating the fluxed surface with molten solder.

ROWLAND D. SMITH.